United States Patent
Joublin et al.

(10) Patent No.: US 8,036,397 B2
(45) Date of Patent: Oct. 11, 2011

(54) METHOD FOR ESTIMATING THE POSITION OF A SOUND SOURCE FOR ONLINE CALIBRATION OF AUDITORY CUE TO LOCATION TRANSFORMATIONS

(75) Inventors: Frank Joublin, Mainhausen (DE); Tobias Rodemann, Obertshausen (DE)

(73) Assignee: Honda Research Institute Europe GmbH, Offenback/Main (DE)

( * ) Notice: Subject to any disclaimer, the term of this patent is extended or adjusted under 35 U.S.C. 154(b) by 1175 days.

(21) Appl. No.: 11/752,849

(22) Filed: May 23, 2007

(65) Prior Publication Data

US 2007/0291968 A1 Dec. 20, 2007

(30) Foreign Application Priority Data

May 31, 2006 (EP) .................................... 06011270

(51) Int. Cl.
*H04R 3/00* (2006.01)
(52) U.S. Cl. .............. 381/92; 381/91; 381/122; 381/17; 381/1; 381/18
(58) Field of Classification Search ................ 381/1, 17, 381/91–92, 18, 303, 309, 122, 74, 356
See application file for complete search history.

(56) References Cited

U.S. PATENT DOCUMENTS

| 3,838,593 | A | 10/1974 | Thompson |
| 4,207,623 | A | 6/1980 | Anderson |
| 4,581,758 | A | 4/1986 | Coker et al. |
| 4,628,529 | A | 12/1986 | Borth et al. |
| 4,933,915 | A | 6/1990 | Boström |
| 5,325,436 | A * | 6/1994 | Soli et al. ............... 381/313 |
| 5,729,612 | A * | 3/1998 | Abel et al. ............... 381/56 |
| 6,826,284 | B1 | 11/2004 | Benesty et al. |
| 6,990,205 | B1 | 1/2006 | Chen |
| 7,787,638 | B2 * | 8/2010 | Lokki et al. ............... 381/92 |
| 2002/0133333 | A1 | 9/2002 | Ito et al. |
| 2003/0035553 | A1 | 2/2003 | Baumgarte et al. |
| 2003/0051532 | A1 | 3/2003 | Beaucoup et al. |
| 2004/0076301 | A1 | 4/2004 | Algazi et al. |
| 2006/0045289 | A1 * | 3/2006 | Kujirai et al. ............... 381/92 |
| 2008/0170711 | A1 | 7/2008 | Breebaart et al. |

FOREIGN PATENT DOCUMENTS

| EP | 1 586 421 A1 | 10/2005 |
| EP | 1 600 791 A1 | 11/2005 |

OTHER PUBLICATIONS

Andersson, S. B., et al., "Robot Phonotaxis with Dynamic Sound-source Localization," Proceedings of the 2004 IEEE International Conference on Robotics & Automation, Apr. 2004, pp. 4833-4838, Piscataway, New Jersey, U.S.A.

(Continued)

*Primary Examiner* — Devona Faulk
*Assistant Examiner* — Disler Paul
(74) *Attorney, Agent, or Firm* — Fenwick & West LLP

(57) ABSTRACT

A method for estimating the location of a sound source. First, a first microphone and a second microphone are moved relative to the sound source. Then the Intra-aural Time Difference (ITD) between the two microphones is measured. The moving and the measuring are repeated until the Intra-aural Time Difference (ITD) is smaller than a predefined threshold.

4 Claims, 8 Drawing Sheets

OTHER PUBLICATIONS

Adamy, J. et al., "A Binaural Sound Localization System for Mobile Robots in Low-Reflecting Environments," Automatisierungstechnik, 2003, pp. 387-395, vol. 51.

Berglund, E., et al., "Sound source localisation through active audition," Intelligent Robots and Systems, IEEE, Aug. 2005, 6 Pages, Piscataway, New Jersey, U.S.A.

Bechler, D. et al., "Three Different Reliability Criteria for Time Delay Estimates," EUSIPCO 2004, XII. European Signal Processing Conference, Sep. 6, 2004, pp. 1987-1990, [online] [Retrieved on Apr. 5, 2006] Retrieved from the Internet <URL:http://www.eurasip.org/content/Eusipco/2004/defevent/papers/cr1196.pdf>.

Blauert, J., "Spatial Hearing: The Psychophysics of Human Sound Localization," 1996, 65 Pages, 2nd Edition, The MIT Press, Cambridge, Massachusetts.

European Search Report, EP 04 030 651, Mar. 15, 2005, 2 pages.

European Search Report, EP 06 000 319.1, Apr. 20, 2006, 8 Pages.

European Search Report, EP 06 011 270.3, Nov. 28, 2006, 11 Pages.

Horiuchi, T. et al., "Iterative Compensation of Microphone Array and Sound Source Movements Based on Minimization of Arrival Time Differences," 2004 IEEE Sensor Array and Multichannel Signal Processing Workshop Proceedings, Barcelona Spain, Jul. 2004, pp. 566-570, Piscataway, New Jersey, U.S.A.

Huang, J. et al., "Sound Localization in Reverberant Environment Based on the Model of the Precedence Effect," IEEE Transactions on Instrumentation and Measurement, Aug. 1997, pp. 842-846, vol. 46, No. 4.

Jin, C. et al., "Neural System Identification Model of Human Sound Localization," J. Acoust. Soc. Am., Sep. 2000, pp. 1215-1235, vol. 108, No. 3.

Nakadai, K. et al., "Real-Time Sound Source Localization and Separation for Robot Audition," Proceedings of the 2002 International Conference on Spoken Language Processing, ICSLP, 2002, pp. 193-196.

Nakadai, K. et al., "Epipolar Geometry Based Sound Localization and Extraction for Humanoid Audition," Proceedings of the 2001 IEEE/RSJ International Conference on Intelligent Robots and Systems, Oct. 29-Nov. 3, 2001, pp. 1395-1400.

Nakadai, K. et al., "Real-Time Active Human Tracking by Hierarchical Integration of Audition and Vision," Proceedings of the 2001 IEEE-RAS International Conference on Humanoid Robots, 2001, 8 pages.

Nakashima, H. et al., "Self-Organization of a Sound Source Localization Robot by Perceptual Cycle," IEEE Proceedings of the 9−th International Conference on Neural Information Processing (ICONIP '02), Nov. 2002, pp. 834-838, vol. 2, Piscataway, New Jersey, U.S.A.

Valin, J-M. et al., "Robust Sound Source Localization Using a Microphone Array on a Mobile Robot," Intelligent Robots and Systems, Oct. 2003, 6 Pages.

Litovsky, R. et al., "The Precedence Effect," *J. Acoust. Soc. Am.*, Oct. 1999, pp. 1633-1654, vol. 106, No. 4, Pt. 1.

\* cited by examiner

Fig. 7 (Average Position; tentative)

METHOD FOR ESTIMATING THE POSITION OF A SOUND SOURCE FOR ONLINE CALIBRATION OF AUDITORY CUE TO LOCATION TRANSFORMATIONS

RELATED FOREIGN APPLICATIONS

This application is related to and claims priority to European Patent Application No. 06 011 270 filed on May 31, 2006, entitled "a Method for Estimating the Position of a Sound Source for Online Calibration of Auditory Cue to Location Transformation."

FIELD OF THE INVENTION

The present invention generally relates to calibrating a sound source localization system by transforming (or mapping) auditory cue information to an estimated position of at least one sound source, more specifically to a sound source localization system for autonomous robotic devices that can be used for estimating locations of sound sources.

BACKGROUND OF THE INVENTION

Estimation of the position of a sound source (i.e., sound source localization) is disclosed, for example, in Jens Blauert, "Spatial Hearing: The Psychophysics of Human Sound Localization," The MIT press, USA-Cambridge Mass., 1996, $2^{nd}$ edition, incorporated herein by reference in its entirety. As described in this reference, the sound source localization is highly dependent on a large number of internal and external parameters, many of which might change over time. Therefore, it is important for an autonomous sound source localization system to have the ability to recalibrate the mapping of auditory cue information to an estimated position of at least one sound source (that is, perform online adaptation) during normal operation in normal working environment of the autonomous system.

A number of approaches including Kazuhiro Nakadai et al., "Real-time sound source localization and separation for robot audition," Proceedings of the 2002 international conference on spoken language processing (ICSLP-2002), pp. 193-196, incorporated herein by reference in its entirety, localize a sound source and then direct attention or direction towards a target which is the source of the sound. The basic concept in all of such approaches measures one or more of so-called localization cues, and maps (or transforms) these cues into estimation of the location (angular position or azimuth angle).

One type of cues for localization are so-called binaural cues that are comparison of signals recorded by microphones located apart by a distance. The binaural cues can be obtained by a pair of microphones as well as an array of microphones having more than two microphones.

Binaural cue computation makes use of the fact that for microphones at different spatial positions, signals travel along slightly different paths to the two microphones. One well-known binaural cue is the Intra-aural Time Difference (ITD, also known as IPD). It measures the distance by detecting the arrival times of the signals at the two microphones. A related cue is the Intra-aural Envelope Difference (IED) which is similar to the ITD. Both the ITD and the IED depend on the location of the sound source in the horizontal plane covering the two microphones, and the distance between the two microphones (and the speed of sound). The presence of any obstacles between the microphones (e.g., a head of a robot) and the shapes of the obstacles have a slight effect when using the ITD.

Another type of second major cue for the sound source localization is the Intra-aural Intensity Difference (IID, also termed ILD). This cue is based on comparison of signal intensities at the two microphones. The presence of any obstacles between the microphones will also affect the signal intensities depending on the location of the sound source.

While the dependency of ITD on source localization can at least be approximated based on known environmental conditions and the distance between the microphones, the IID depends on the shape, material and density of any obstacles present between the microphones. It is therefore very difficult to compute the IID as a function of the location of the sound source. In addition to the basic dependencies, there are a number of additional factors that might affect computation of the cue: different levels of signal amplification at the two microphones, non-synchronization of the recording of left and right microphones, types and exact locations of the microphones, types and presence of auditory pre-processing stages, the particular method used in computing the cue computation, etc.

Especially the analog part of the recording equipment is prone to changes due to temperature drifts and variable operating time (system warm up). Another important factor is the room characteristics (e.g., echoes) which might also strongly affect the estimation of the sound source localization.

Therefore, it is a standard practice to calibrate the system in advance in a dedicated setup to learn the relation between the location of the sound source and IED/ITD/IID cue values. These calibration measurements are generally time-consuming and require a substantial amount of efforts and time to execute. Further, this calibration has to be repeated whenever there is a change in the parameter of the system hardware, for example, mounting microphones onto a different head of a robotic device, using new recording hardware, modification to the amplification factors, etc. For any changes made to the software, at least part of the calibration procedure has to be repeated. Any of those effects would require a new, lengthy calibration procedure.

It is therefore advisable to allow the system to learn the relation between cues and location of the sound source continuously in an unsupervised manner. However, the state-of-the-art approaches for learning the cue value—position relation either require special test scenarios (that is, bringing the system into a defined environment and running a dedicated calibration procedure) or the location information from additional sensors. These additional sensors so far work only under very constrained conditions.

European Patent Application No. 1 586 421 A1 discloses a system for sensory-motor learning in a visual learning system which has the basic characteristics for online adaptation necessary for a truly autonomous system. However, an important prerequisite to adaptation is to obtain the information about the true location of the sound source. If for measured cue values C, the true relative location p of the sound source is known, learning is trivial. Using a mapping function T, the following equation applies: $T(C)=p$. As for consecutive measurements for the same cue value C, the following equation applies:

$$T(C, t+1) = T(C, t) + \text{alpha} * (p(t) - T(C, t)),$$

where t represents time step, and alpha represents a learning parameter (0<alpha<1). Alternatively, the mapping function may be of the type $T(p)=C$ as shown in FIG. 3. T may be implemented for example by a look-up table.

Hiromichi Nakashima et al., "Self-Organization of a Sound Source Localization Robot by Perceptual Cycle," 9th International Conference on Neural Information Processing (ICONIP'02), 2002 discloses an auto-calibration procedure that uses cameras to visually identify the sound source and measure its location. This approach can not be used for the online-adaptation because it is not easy to visually identify a sound source. In the example described in this article, a red mark was placed on the speaker box to identify the source. However, this requires that no other red objects be present in the environment.

What is needed is a method and system for detecting the location of a sound source using only auditory inputs. There is also a need for a method and system for reducing the cost of hardware and constraints for detecting the location of the sound source. Further, there is a need for a method and system for calibrating the sound source localization in realistic settings that provides a robust performance for a prolonged period of time. Furthermore, there is also a need for a method and system providing a continuous adaptation that can better learn a cues/localization estimation mapping than standard calibration procedures.

SUMMARY OF THE INVENTION

One embodiment of the present invention provides a method and system for detecting the position of the sound source, preferably using only auditory inputs. Also, the method and system allows an online calibration in realistic settings. The method and system according to one embodiment of the present invention allow a continuous re-adaptation instead of a lengthy off-line calibration procedure. In contrast to an alternative approach using visual (camera) input to guide adaptation, the system according to one embodiment of the present invention can work solely on auditory inputs, reducing the cost of hardware and, reducing the constraints on the method and system.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present invention can be readily understood by considering the following detailed description in conjunction with the accompanying drawings.

DETAILED DESCRIPTION OF THE INVENTION

Figure 1:
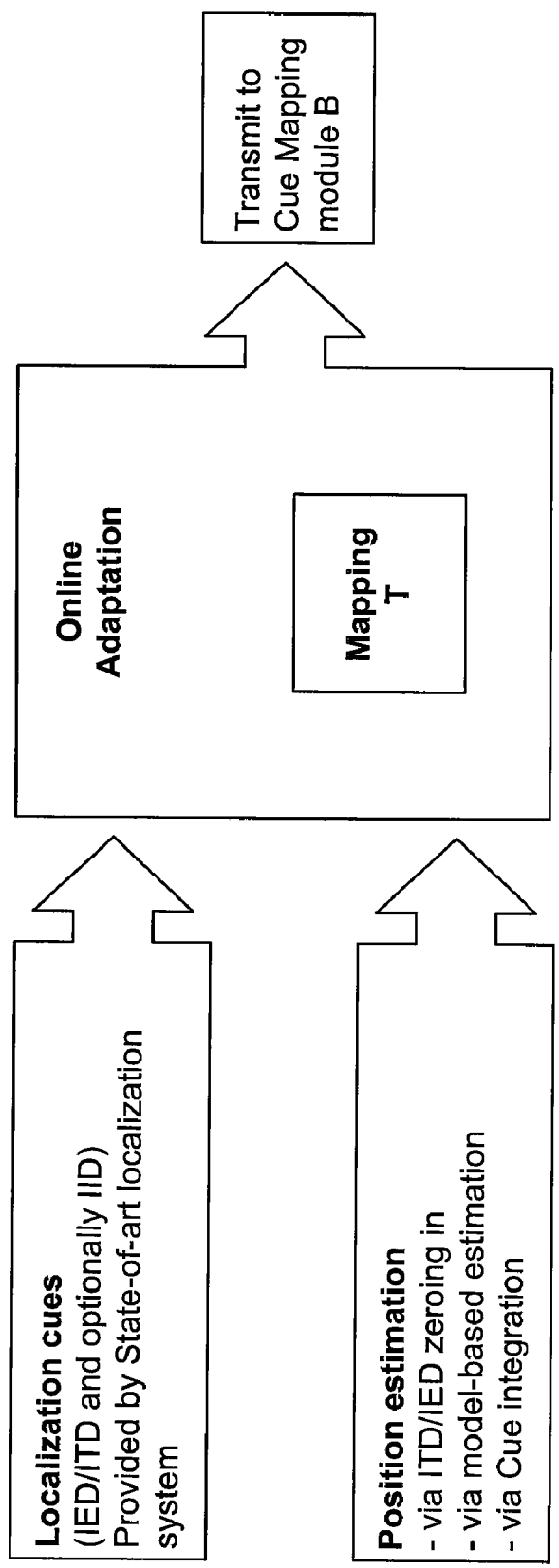
FIG. 1 is a schematic diagram illustrating the basic concepts in online adaptation, according to one embodiment of the present invention.

A preferred embodiment of the present invention is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

FIG. 1 shows the basic concept of online adaptation according to one embodiment of the present invention. Localization cues such as IED/ITD, and optionally IID may be provided by a conventional localization system. The position may be estimated either by zeroing in using the ITD/IED, by model-based estimation, or by cue integration. Both localization cues and estimated position are supplied to an online adaptation module where the mapping T from the cue values to a defined coordinate system (e.g., space or actuator) is computed. The mapping T is transmitted to a cue mapping module B. Using the mapping transformation matrix T, the estimated location of a sound source can be calculated based on provided auditory localization cue signals.

Figure 2:
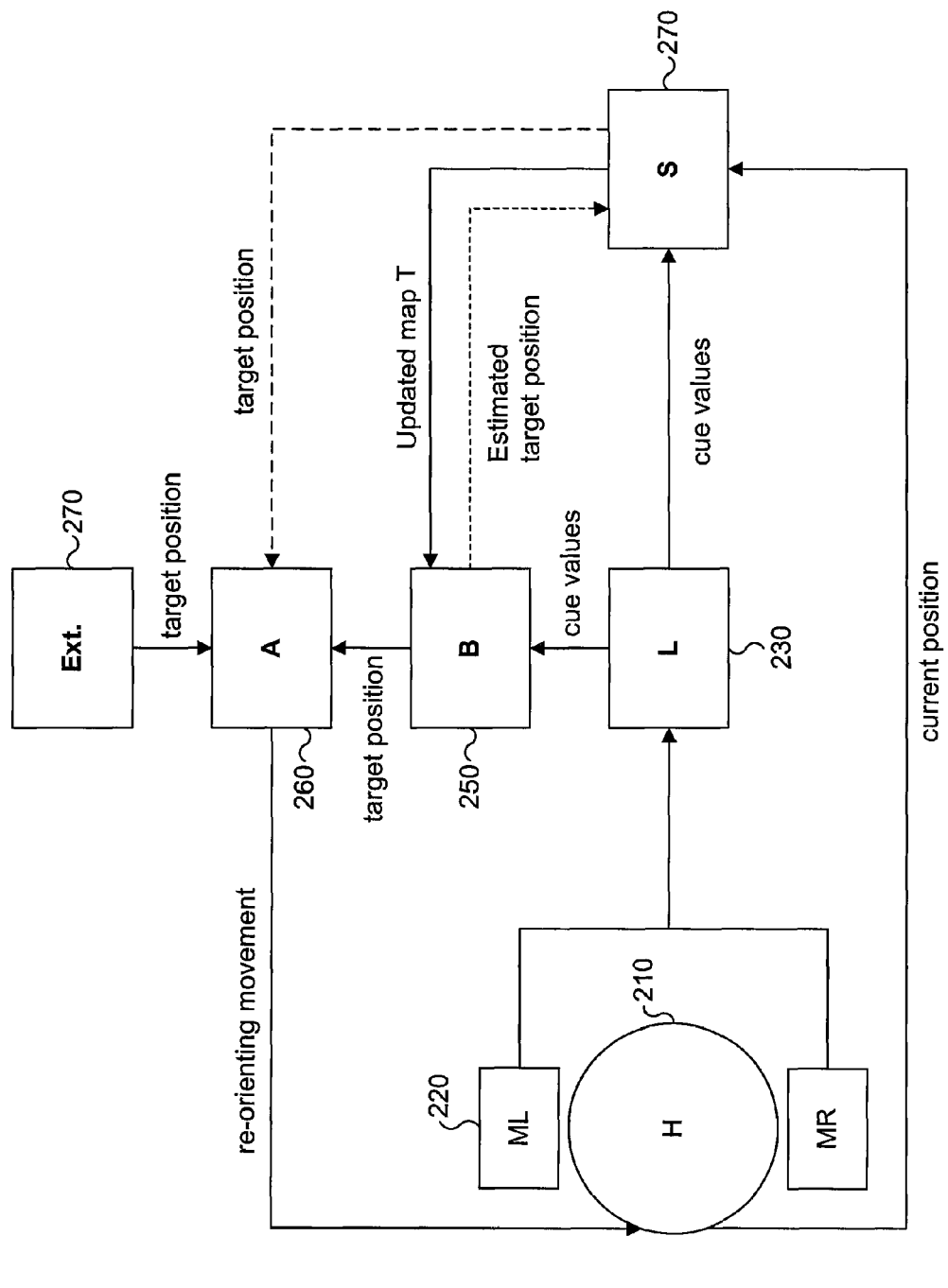
FIG. 2 is a block diagram illustrating a system for sound source localization, according to one embodiment of the present invention.

FIG. 2 shows a configuration of a system 200 for sound source localization (i.e., estimation of the location of the sound source) according to one embodiment of the present invention. It is assumed that the sound source (e.g., a talking human) is active over a period longer than the time needed for the online adaptation.

The system 200 comprises a mobile platform 210 capable of motions such as rotation, and a set of at least two microphones ML, MR 220. The mobile platform 210 can be, among other platforms, the head of a humanoid robot. The microphones 220 may be mounted on a head 210 of the robot. For the purposes of the following description, but by no means limiting the invention, it is assumed that the microphones ML, MR are placed at opposite sides of the robot head 210 in a symmetrical manner so that when the distances from both microphones 220 to the sound sources are equal, the sound source is right in front of the robot's head 210 (that is, the face of the robot faces the sound source).

The system 200 further comprises a first device L 230 for computing localization cues C based on the signals provided by the microphones ML, MR, 220 and a second device B 250 for transforming cue values C into motor coordinates p using a mapping function T. The location of the sound source can be estimated, for example, using the method disclosed in Kazuhiro Nakadai et al., "Real-time sound source localization and separation for robot audition," Proceedings of the 2002 international conference on spoken language processing (ICSLP-2002), pp 193-96; and Hiromichi Nakashima et al., "Self-Organization of a Sound Source Localization Robot by Perceptual Cycle," 9th International Conference on Neural Information Processing (ICONIP'02), 2002, which are incorporated by reference herein in their entirety. These two methods are exemplary, and any other methods may be employed to estimate the location of the sound source using the mapping function.

The system according to one embodiment of the present invention further comprises a learning module S 270 that receives information about current position p and measured cue values C(p). Based on p and C(p), the learning module updates the mapping function T and sends the updated version to the control device B 250. In one embodiment of the invention, the learning module S 270 may also initiate rotating movements of the platform H 210. In another embodiment of the invention, the learning module S 270 may also receive an estimated target position from the second device B 250 for transforming cue values into motor coordinates p using a mapping function T.

The system may also comprise an arbiter device A 260. Nominal target positions for the platform H 210 generated by an external module EXT 270, by the second device B 250 or by the learning module S 270, may all be fed into the arbiter device A 260. The arbiter device A 260 then effects movements on the platform H 210 according to the adaptation method or an external control module.

Figure 3:
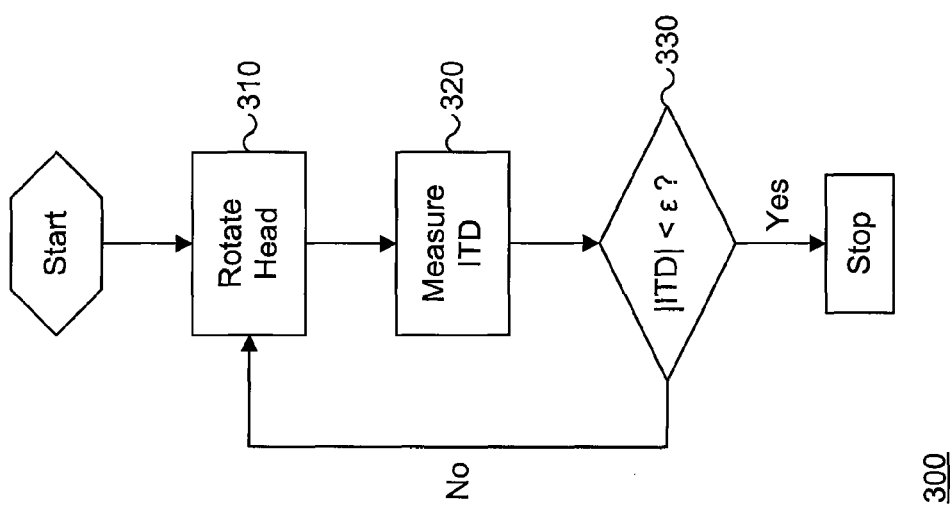
FIG. 3 illustrates a flowchart illustrating a method for sound source localization, according to one embodiment of the present invention.

FIG. 3 shows a flowchart 300 of a method for an online calibration of a system according to one embodiment of the present invention. The method for estimating the position of a sound source uses a system comprising modules, for example, as described above with reference to FIG. 2.

In step 310, the head of the robot with the microphones mounted are rotated towards the sound source. The rotation may be controlled based on a full scan over all positions performed before the rotation during which IED and/or ITD values at all the positions are measured by the microphones. Alternatively, the rotation may be controlled based on a gradient-based method in which the measured IED/ITD values are analyzed.

In step 320, the Intra-aural Time Difference (ITD) between the two microphones ML, MR is continuously measured by the device L 230 in the position defined by step 310. This is accomplished by reading the next ITD output from the device L 230.

In step 330, it is verified whether the ITD measured in step 320 is smaller than a predefined threshold $\epsilon$. Because the ITD depends mostly on the differences in distances between the two microphones ML, MR and the sound source, the ITD will approach zero as the difference in the distances between the sound source and the two microphones becomes smaller.

If the ITD equals zero or is close to zero, steps 310 and 320 are reiterated. If the ITD does not equal zero or is close to zero, the algorithm stops, and it is assumed that the microphones ML, MR are aligned so that they are equally distant from the sound source. Rotating the head until the ITD cue value reaches a predefined threshold $\epsilon$ will bring the sound source to a defined relative position vis-à-vis the microphones ML, MR. In case of a robot head with a symmetrical microphone placed on opposite sides of the head, the defined position refers to the position where the face of the robot head faces the sound source.

During the orienting movements of the platform H 210 towards a minimal ITD value, all cue value-position pairs can be stored and later used for adaptation of the mapping once the estimation of the position of the sound source has been terminated.

In one embodiment of the invention, the source signals may be split into different frequency channels (using, for example, FFT or Gamma-tone filter bank as disclosed in Kazuhiro Nakadai et al., "Real-time sound source localization and separation for robot audition," Proceedings of the 2002 international conference on spoken language processing (ICSLP-2002), pages 193-96). In this case, the best performance may be achieved if the absolute value of ITD summed over many frequency channels (for example, up to approximately 1 kHz) is used.

In another embodiment of the present invention, a method based on IED may be used in addition or alternatively to the above-described method.

Figure 4:
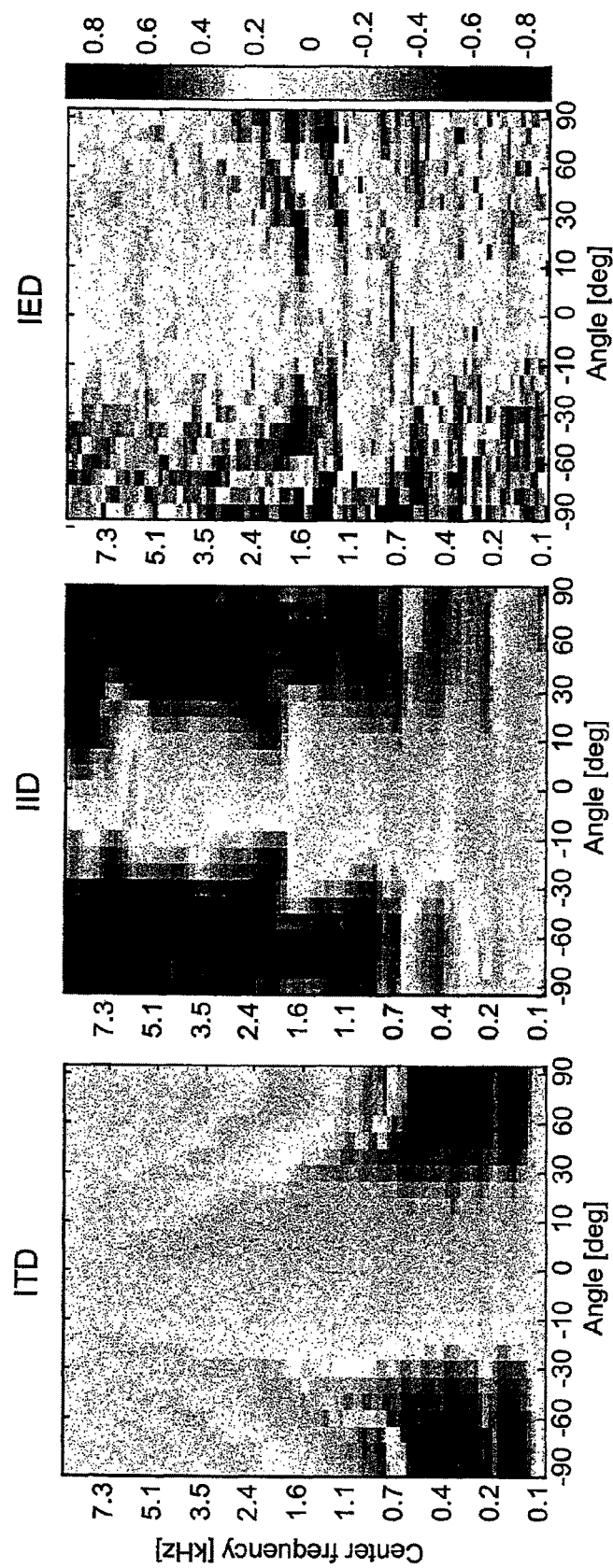
FIG. 4 shows an example of a mapping T(p) between relative source positions, according to one embodiment of the present invention.

FIG. 4 shows an example of a mapping T(p) between relative source positions (from −90 to +90 degrees relative to the current orientation of the platform H 210) and cue values (IED, IID, and ITD) for different frequency channels (after applying a Gamma-tone filter bank), according to one embodiment of the present invention.

Figure 5:
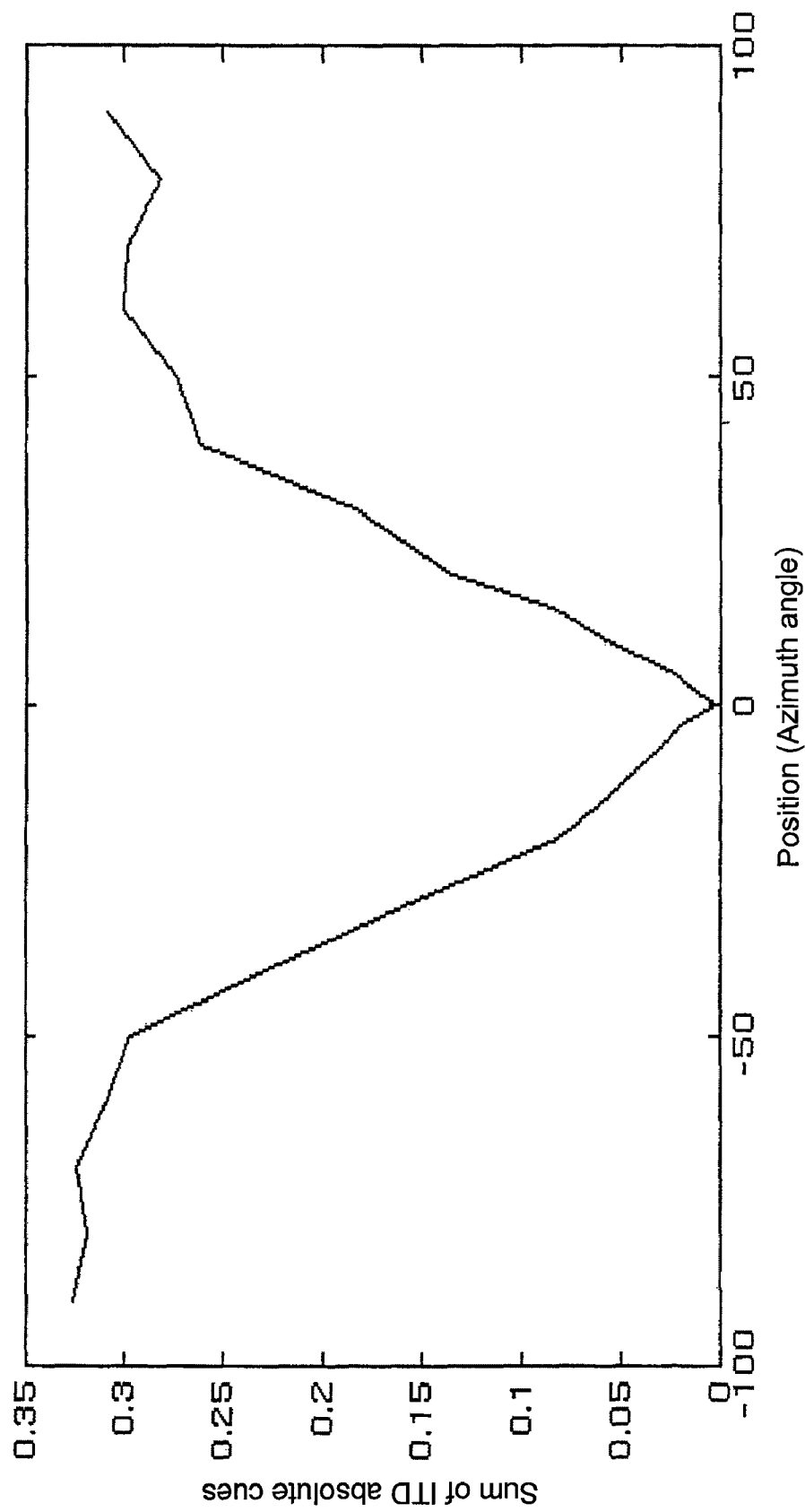
FIG. 5 shows the absolute value of ITD as a function of position of an exemplary robot system, according to one embodiment of the present invention.

FIG. 5 shows the absolute value of ITD values as a function of position for an exemplary robot system, according to one embodiment of the present invention. As shown in FIG. 5, the minimum value of absolute ITD values is obtained at around 0 degrees (facing the sound source). The estimation of the true location of the sound source can be framed as determining the minimum value of the absolute value of the ITD values according to this mapping. In one embodiment of the invention, the minimum value can be searched by following the gradient of the ITD measurements. In another embodiment of the invention, the minimum value can be searched by performing a full scan over all positions of the platform H 260, and then analyzing the ITD and/or IED values measured during the full rotational scan.

Figure 6:
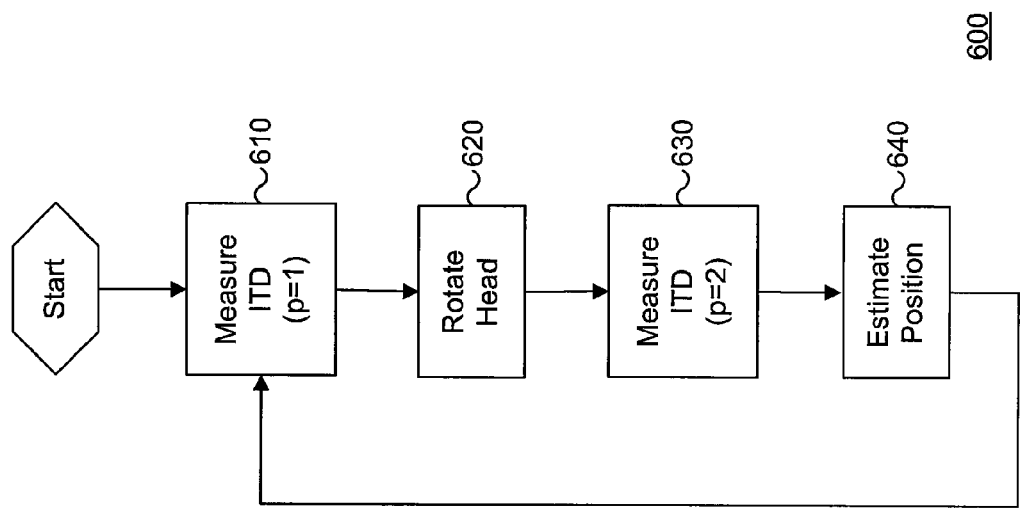
FIG. 6 is a flowchart illustrating a method for sound source localization, according to another embodiment of the present invention.

FIG. 6 shows a flowchart 600 of a method for an online calibration of a system for estimating the location of a sound source, according to another embodiment of the present invention. In the following description, the "true" position (i.e., the final estimated location) of the sound source will be designated by s. The position of the platform H 210 will be referenced by p.

In step 610, a first measurement of ITD (and/or IED) is obtained at an initial position p=p1 of the platform H 210. The first measurement is referred to as ITD(p1) in the following description.

In step 620, the platform H is rotated in an arbitrary direction, from an initial position p=p1 to a position p=p2.

In step 630, a second measurement of ITD (and/or IED) is obtained at position p=p2 of the platform H 210. The second measurement is referred to as ITD(p2) in the following description.

In step 640, the true position of the sound source is estimated using the two previously made measurements ITD(p1) and ITD(p2) of the ITD (and/or IED). In one embodiment of the present invention, it is assumed that there is a linear or at least a constant relationship between the location of the sound source and the cue values. Then, the true position s may be estimated using linear interpolation.

Taking two measurements (ITD(p1), ITD(p2)) at two absolute positions p=p1 and p=p2, the true location s of the sound source may be estimated by using the following linear model:

$$ITD(p)=a*(p-s)$$

wherein p is the position of the platform H 210, a is the slope of the line, and s the true location of the sound source. Using the two measurements, a and s may be computed as follows:

$$a=(ITD(p1)-ITD(p2))/(p1-p2)$$

$$s=(ITD(p2)*p1-ITD(p1)*p2)/(ITD(p2)-ITD(p1))$$

Based on this computation, the absolute (body-centered) coordinates p1 and p2 can be translated to relative coordinates (p1-s), (p2-s). The two measurements can also be used for updating the mapping function T. Note that there is no requirement on the values of p1 and p2 other than they be different. Therefore, controlling the orientation of the platform H 210 may be delegated to an external module Ext 270, which allows an adaptation in parallel to the normal operation of the system. After measuring a third position p3 and ITD (p3), the same steps as described above can be performed on p2 and p3.

In another embodiment of the invention, any other functions with a small number of parameters may be used in lieu of a linear model. The precision of the learning mapping depends on the similarity of the model to the true map. In most cases, at least rough mapping can be attained.

Previous methods and systems for sound source localization use a frequency representation from which they extract cues. Therefore, for every sound event there may be a number of cues (e.g., IED, IID, ITD) for many different frequency channels. If it is assumed that only a few channels/cues are decalibrated, it is possible to compute the likely target location from the integration of all cues and channels and then using this estimated position to adapt the mapping.

Figure 7:
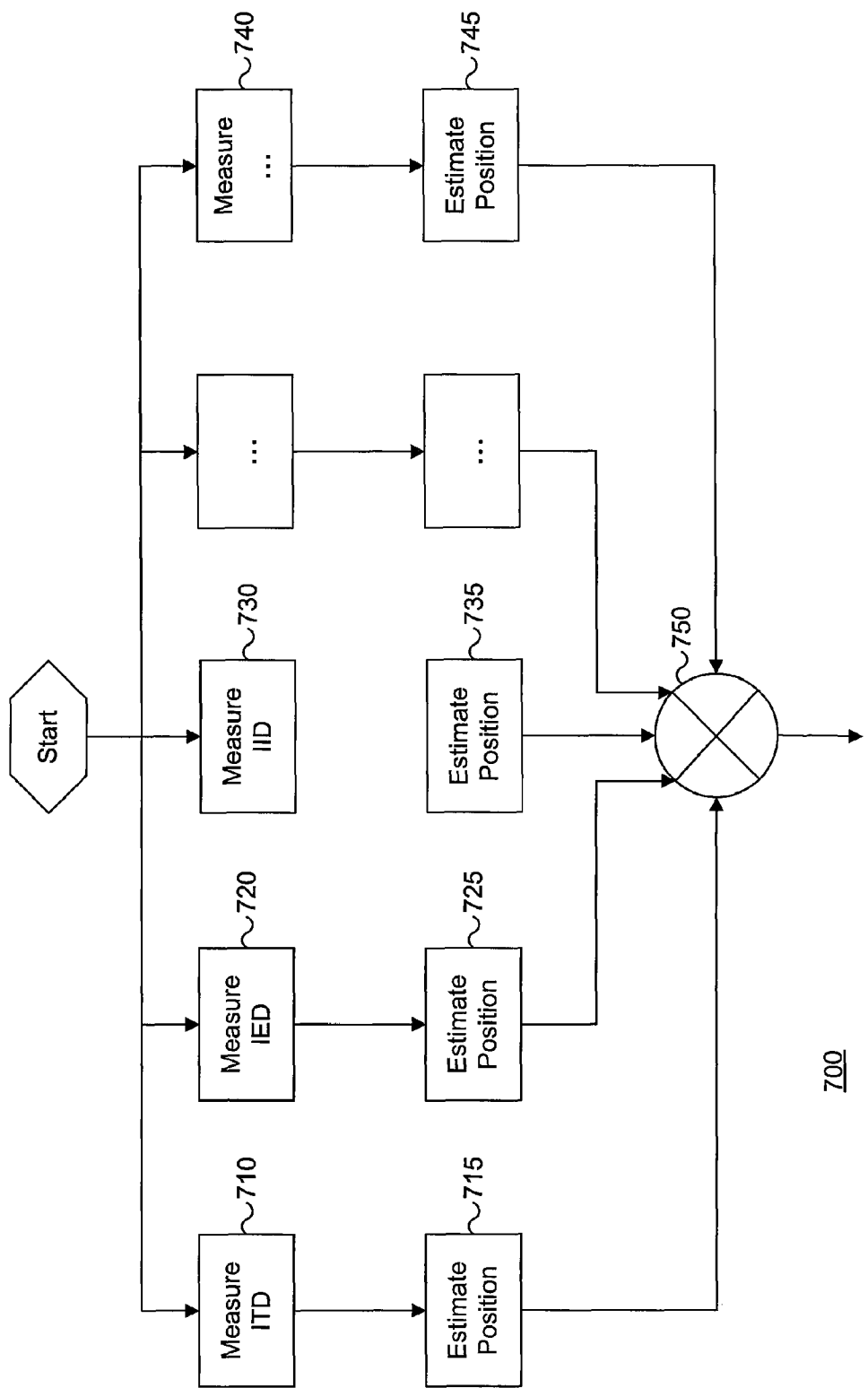
FIG. 7 is a flowchart illustrating a method for sound source localization, according to another embodiment of the present invention.

FIG. 7 shows a method for determining the location of the sound source, according to one embodiment of the present invention. In a first phase, a multitude of cues are measured in parallel (steps 710, 720, 730, 740). The multitude of cues may comprise Intra-aural Envelope Difference (IED), Intra-aural Intensity Difference (IID), and Intra-aural Time Difference (ITD). Optionally, the multitude of cues may be computed for a multitude of different frequency channels.

In a second phase (steps 715, 725, 735, 745), each cue is used individually to estimate the position of the sound source. Then, in step 750, the estimated positions are used to form an average position estimate. The average position estimation may be formed by a method that tolerates errors in individual cues and/or frequency channels. Optionally, the step of computing individual position estimates may be skipped in a method that derives a position estimate directly from the different localization cues.

In another embodiment of the present invention, vision inputs may be integrated at this stage to form an additional cue.

In yet another embodiment of the present invention, different cues and channels in the integration and localization process may be weighted, giving less weigh to cues/channels with low confidence. The computation of confidence may be based on how well a specific cue/channel coincides in its responses (measured over longer periods of time) with the sum of all cues.

A change in the system's gain factor at just one side (or different changes on both sides) can seriously affect the IID cues because the IID is strongly affected by signal gain factors (a factor that linearly scales the signal) of microphones, A/D converters, and software pre-processing. In one embodiment of the present invention, an artificial gain factor g(t) for one microphone (e.g., the left microphone) may be added to resolve this issue. The artificial gain factor g(t) for the microphone can be added by using the following method: Whenever the system is focusing on the sound source (ITD<ϵ), the additional gain factor g(t) may be updated to bring IID to 0:

$$g(t+1)=g(t)*(1-\text{alpha2}*IID(t|ITD<\epsilon)),$$

where alpha2 is a learning parameter. This assumes that IID is positive (>0) if the recorded signal is louder in the left microphone than in the right microphone. In the opposite case, the minus sign in the previous equation is replaced by a plus sign. The adaptation of the gain factor may also be done separately for all frequency channels.

The different embodiments described above with reference to FIGS. 3, 6 and 7 have different advantages. The embodiment described above with reference to FIG. 3 can learn the exact mapping, but may use a potentially large number of specific orienting movements to learn the mapping. The embodiment described above with reference to FIG. 6 can be performed in parallel and requires no specific movements. The localization error should be monitored in the embodiments of FIGS. 6 and 7.

Figure 8:
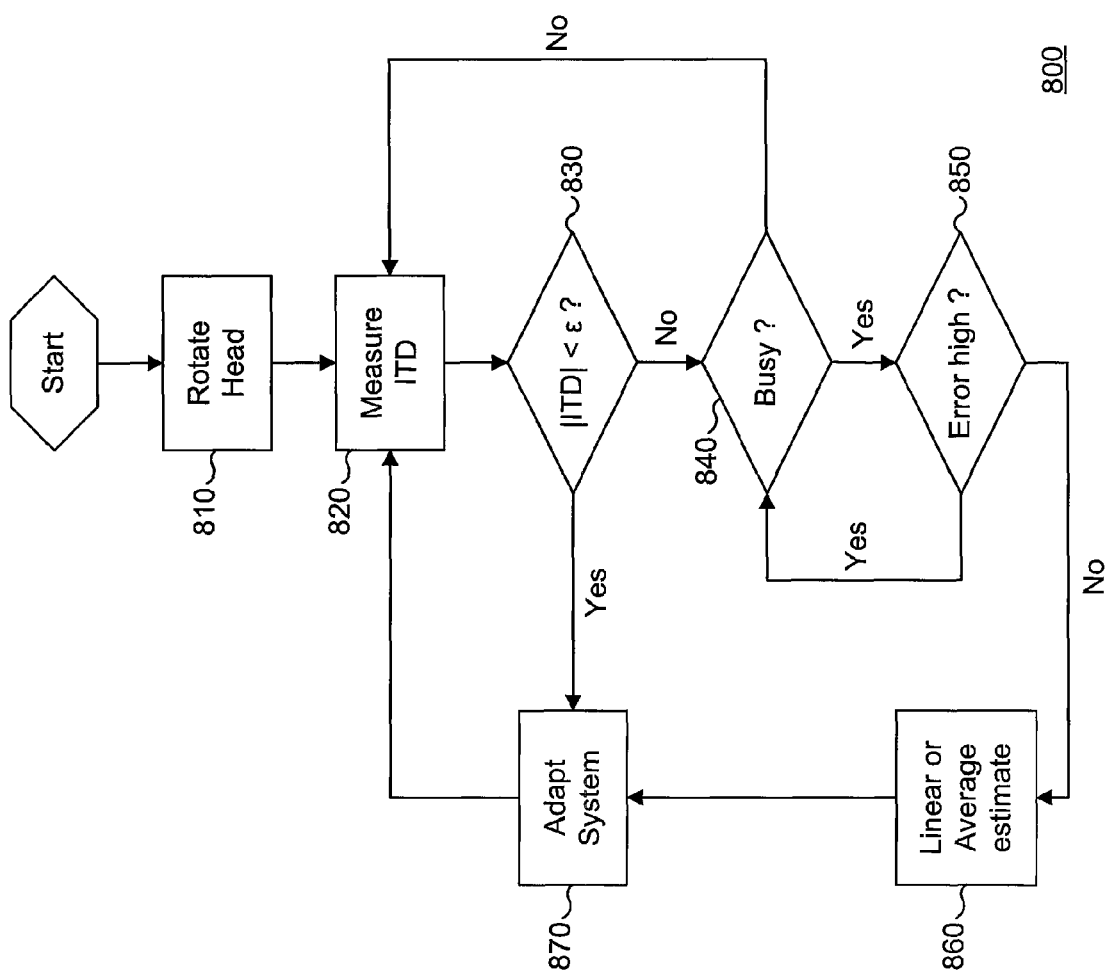
FIG. 8 is a flowchart for controlling the position of the head of a robot based on sound localization, according to one embodiment of the present invention.

In another embodiment of the invention, now described in relation to FIG. 8, a robot system may have many different head control and learning modes. Different modes may be selected via the arbiter module A 260. The selection among the modes may depend on the mean localization error E (based on the mean ITD value after a targeting movement). The selection may also depend on the requirements of the external control system EXT 270 including, among other requirements, whether some task to be executed requires a movement of the platform H 210 or not.

As shown in FIG. 8, the head of the localization system is rotated in step 810. Then, a localization cue (the ITD), is measured in step 820. In step 830 it is checked whether the ITD is smaller than a predefined threshold ϵ. If the ITD is smaller than the threshold, the system is adapted to the known position of the sound source. Then, the system waits for the next sound signal (waiting step not shown for simplicity).

If ITD is larger than a predefined threshold, then the method proceeds to step 840, where it is checked whether the overall system has the capacity to execute extra orienting movements or whether it is busy. If the system has the capacity, a new rotation is initiated and the method returns to step 820. If the system is too busy to execute a rotation, then it is checked in step 850 whether the smoothed localization error is high. If the smoothed localization error is high, the method returns to step 840. If the smoothed localization error is not high, then the location of the sound source may be estimated using the methods described above with reference to FIG. 6 or 7.

The smoothed localization error is computed by measuring the absolute values of the ITD directly after a targeting motion (where ITD values should be around zero). This error is integrated over a plurality of subsequent targeting motions (temporal smoothing).

Learning according to the embodiment of FIG. 6 can be carried out even when the system is busy.

The only requirement is that another movement be executed. This can be driven by a signal from the module EXT 270 or a target orienting movement.

If the localization error gets too high or can not be reduced any more, the learning approaches described above with reference to FIGS. 6 and 7 should be disabled. Then, the embodiment described above with reference to FIG. 3 may be used to improve the performance. The embodiment of FIG. 3 should be used only if no target positions are given from module EXT 270 or if the localization performance is very poor (E>threshold). Once performance improves, the methods described above with reference to FIGS. 6 and 7 may then be reactivated.

Switching is executed through a cooperation of modules A and S.

The system is adapted in step 870.

Whenever there is nothing else to perform (no outputs from EXT 270 or B 250), the system can start to home in on the sound source (refer to FIG. 3). This has to be done whenever the localization error (smoothed sum of the ITD after targeting motion) is too high. If the error is sufficiently low, the learning runs in the background, taking advantage of the movements triggered by modules EXT 270 or B 250.

The system or method according to the present invention, the performance of the localization will be far more robust over longer periods of time. Furthermore, the system or method according to the present invention may result in better cues and/or localization estimation mapping than standard calibration procedures.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A method for determining location of a sound source, comprising:
    obtaining a first measurement of ITD and/or IED of acoustical signals originating from a sound source at an unknown location using microphones of a platform in a first position;
    rotating the platform from the first position to a second position different from the first position;
    obtaining a second measurement of ITD and/or IED at the second position of the platform; and
    estimating the location of the sound source using the first and second measurements, wherein the step of estimating the location of the sound source comprises using a linear model represented by ITD(p)=a*(p−s), where p is a position of the platform, a is the slope of a line for the linear model, and s is the location of the sound source.

2. The method of claim 1, wherein the step of estimating the location of the sound source comprises linear interpolating the first and second measurements.

3. A computer-readable storage device having embodied thereon program code for storing instructions executable by a processor, the instructions when executed cause the processor to:
    obtain a first measurement of ITD and/or IED of acoustical signals generated by at least two microphones receiving sound from a sound source at an unknown location using microphones of a platform in a first position;
    rotate the platform from the first position to a second position different from the first position;
    obtain a second measurement of ITD and/or IED at the second position of the platform; and
    estimate the location of the sound source using the first and second measurements, wherein the location of the sound source is estimated using a linear model represented by ITD(p)=a*(p−s), where p is a position of the platform, a is the slope of a line for the linear model, and s is the location of the sound source.

4. The computer readable storage device of claim 3, further comprising estimating the location of the sound by linear interpolating of the first and second measurements.

* * * * *